United States Patent [19]

Habicht

[11] Patent Number: 5,344,275
[45] Date of Patent: Sep. 6, 1994

[54] METHOD AND APPARATU FOR LIFTING TURNING AND TILTING OF CONTAINERS

[76] Inventor: Helmut Habicht, 15 Royal Park Ter., Hillsdale, N.J. 07642

[21] Appl. No.: 35,417

[22] Filed: Mar. 23, 1993

[51] Int. Cl.⁵ .............................................. B65G 65/23
[52] U.S. Cl. ................................. 414/420; 414/758; 414/422
[58] Field of Search ............... 414/419, 420, 421, 422, 414/403, 404, 628, 629, 639, 640, 641, 642, 728, 742, 743, 592, 192, 758, 425; 187/9 R, 9 E

[56] References Cited

U.S. PATENT DOCUMENTS

| | | | |
|---|---|---|---|
| 1,824,339 | 9/1931 | Foradas et al. | 414/420 X |
| 3,235,212 | 2/1966 | Baumiller, Jr. | 414/421 X |
| 3,522,893 | 8/1970 | Yokich | 414/420 |
| 4,353,675 | 10/1982 | Risener et al. | 414/419 X |
| 4,797,050 | 1/1989 | Habicht | 414/420 |
| 4,954,037 | 9/1990 | Habicht | 414/422 X |
| 5,205,699 | 4/1993 | Habicht | 414/420 |
| 5,207,550 | 5/1993 | Lehman | 414/420 |
| 5,257,890 | 11/1993 | Vickary | 414/758 X |

*Primary Examiner*—Frank E. Werner
*Assistant Examiner*—James Eller
*Attorney, Agent, or Firm*—Patrick J. Pinto

[57] ABSTRACT

A container manipulating method and apparats which includes at least one vertically disposed pedestal assembly (12); a tubular column assembly (14); a container support assembly (16); and a container retaining means (18). This method and apparatus houses all of the independently controlled and powered drives for the lifting, turning, and tilting actions completely interior of the column assembly (16). The column assembly (14) may include at least one end seal and a slot closure for minimizing unwanted materials entering or leaving the column assembly. The container (22) retained on the container support assembly (16) may be manipulated from a first position to a subsequent position by lifting, lowering, turning, and tilting movements in series or in combination.

11 Claims, 3 Drawing Sheets

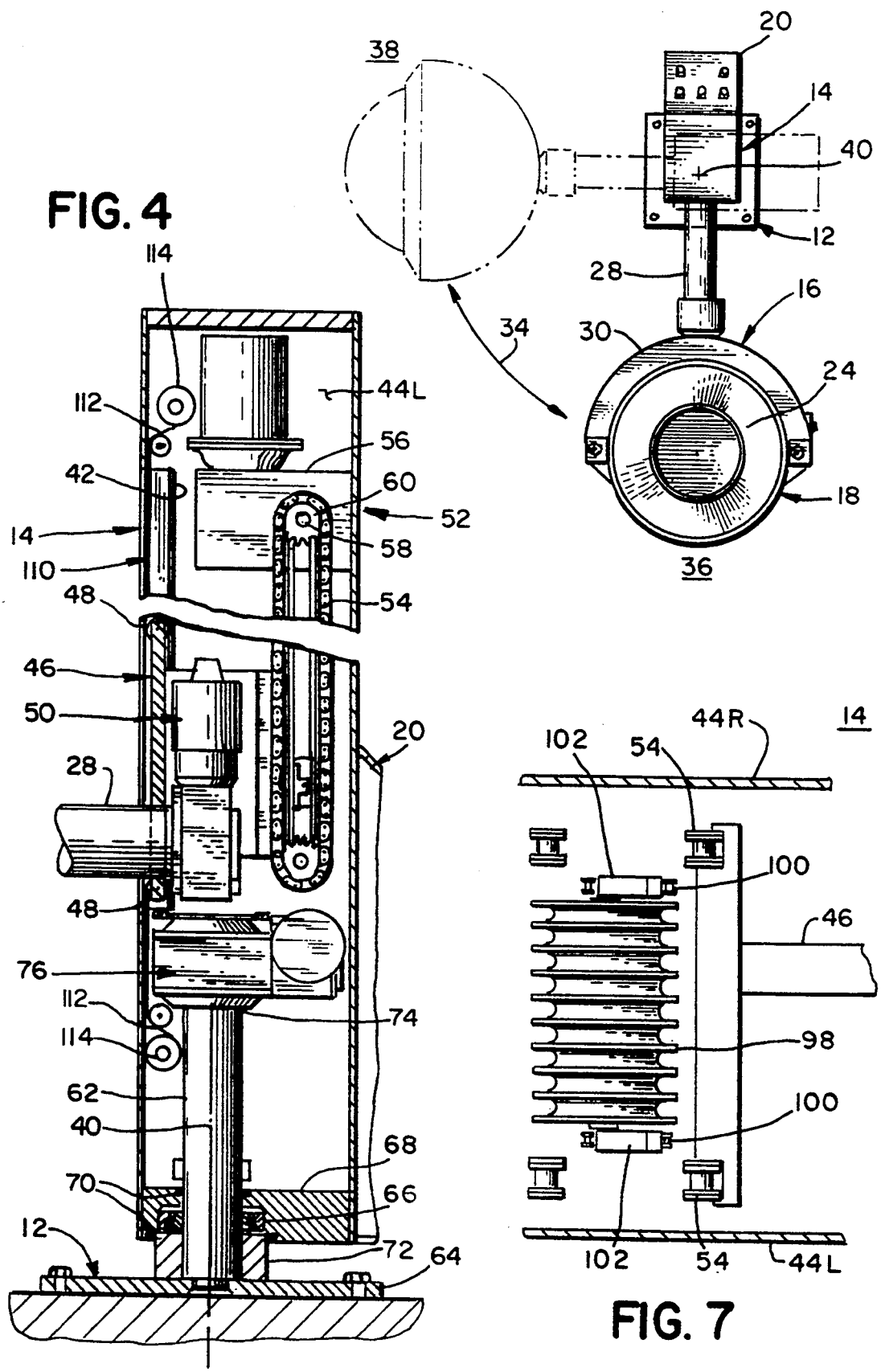

METHOD AND APPARATU FOR LIFTING TURNING AND TILTING OF CONTAINERS

BACKGROUND OF THE INVENTION

1. Field of the Invention

With regard to the classification of art, this invention is believed to be found in the general class entitled "Material or Article Handling", and more particularly to the subclasses pertaining to rotating cradles which have a non fixed pivot. This apparatus and method provides for the elevation, as well as the arcuate turning or positioning of the cradle about a vertical axis.

2. Description of the Related Art

The lifting and tilting of receptacles such as containers, drums and the like is the subject of my U.S. Pat. No. 5,205,699, issued on Apr. 27, 1993; my U.S. Pat. No. 4,797,050 issued on Jan. 10, 1989; and my U.S. Pat. No. 4,954,037, issued on Sep. 4, 1990. Each of my listed and identified Applications and Patents are soley owned by me.

U.S. Pat. Nos. 4,797,050 and 4,954,037 are directed to and teach the use of a camming trackway to provide the tilting action of the cradle. The degree of the tilting action is dependent on the magnitude of the lift. This dependency has been found to place limitations on the versatility and use of the apparatus. The listed U.S. Pat. No. 5,205,699 teaches the independent lifting and tilting of the cradle supporting the container. It has been determined that a need exists for a lifting and tilting apparatus which also includes a turning capability, meaning that the apparatus is capable of locating the cradle along an arcuate path. The axis for this arcuate path falls within the side walls of a substantially vertical column assembly.

The present invention provides an apparatus and method which provides a lifting, turning, and tilting apparatus which solves the need, which was previously described. This present invention also provides an apparatus which is well suited for use in a processing plant #or food, pharmaceuticals, and the like. This present invention encloses all of the powered means for lifting, turning, and tilting within the walls of the column assembly. One of the embodiments of the present invention includes a sealing means for controlling unwanted materials from entering or leaving the column assembly.

SUMMARY OF THE INVENTION

This invention may be summarized with respect to its objects. It is an object of this invention to provide and it does provide an apparatus for manipulating receptacles such as containers, drums and the like by independently controlling the lifting, turning, and tilting action.

It is also an object of this invention to provide and it does provide an apparatus for the powered manipulative lifting, turning, and tilting of a container. This apparatus encloses all of its powered means-for manipulating a cradle within the side walls of its column assembly.

It is another object to provide and it does provide an apparatus for manipulating a container, drum or the like which locates the vertical axis of the pivot for its turning action within the side walls of its column.

It is still a further object of this invention to provide and it does provide an apparatus for lifting, turning and tilting of a container which provides a means for excluding unwanted materials from entering or exiting its column assembly.

It is still a further object of this invention to provide and it does provide an apparatus for manipulating a container which includes a means for controlling the path of a plurality of flexible conductors. This controlling means also limits the tensile stress on the flexible conductors to within desired limits.

It is yet another object of this invention to provide and it does provide an apparatus for manipulating a container, drum or the like which may be attached to a lower and/or upper structure.

In addition to the above summary, the following disclosure is detailed to insure adequacy and aid in the understanding of this invention. This disclosure, however, is not intended to cover each new inventive concept no matter how it may be disguised either by variations in form or additions by further improvements. For this reason, there has been chosen specific embodiments of a method and apparatus for the lifting, turning, and tilting of containers, drums and the like. The specific embodiments have been chosen for the purpose of illustration and description as shown in the accompanying drawings wherein:

BRIEF DESCRIPTION OF THE DRAWING

FIG. 3 represents a plan view of the apparatus of FIG. 1, this view showing its turning capability in dashed outline.

FIG. 4 represents a side sectional elevation of a column assembly of the present invention, this view being partly schematic and taken along line 4—4 of FIG. 2.

FIG. 7 represents a fragmentary plan view of the lifting and auxiliary chains, this view being taken along line 7—7 of FIG. 6.

Figure 1:
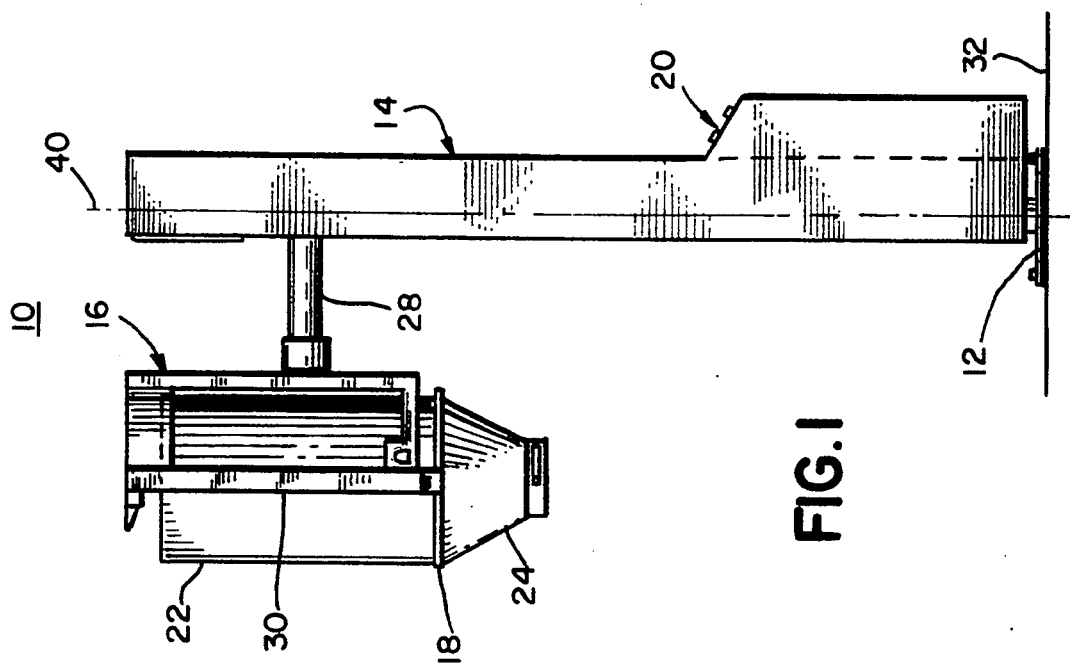
FIG. 1 represents a side elevation of the apparatus of the present invention, this view showing a container in an elevated and inverted condition.

In the following description and in the claims, various details are identified by specific names for convenience. These names are intended to be generic in their application while differentiating between the various details. Corresponding reference characters refer to like members throughout the several figures of the drawings.

The drawings accompanying, and forming a part of this specification disclose details of construction for the sole purpose of explanation. It is understood that structural details may be modified without departing from the concept and principles of the invention. This invention may be incorporated in other structural forms than shown.

DETAILED DESCRIPTION OF THE INVENTION

Figure 2:
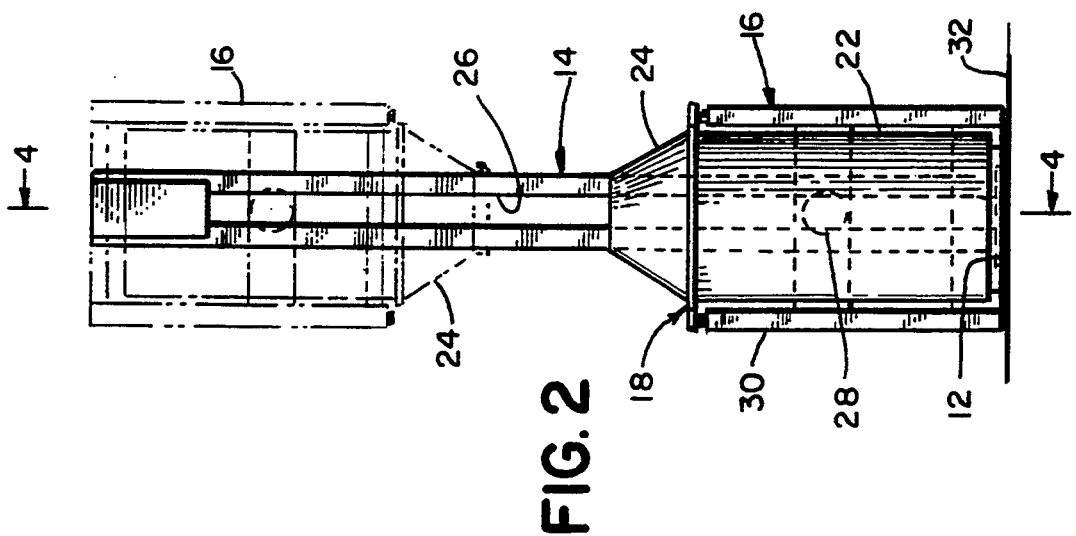
FIG. 2 represents a front elevational view of the apparatus of the apparatus in FIG. 1, this view showing a container in a lowered condition, as a solid outline, and in a lifted condition, as a dashed outline.

Referring first to FIG. 1, FIG. 2, and FIG. 3, an apparatus for the lifting, turning, and tilting manipulation of a container, drum or the like is generally identified as 10. This apparatus 10 includes a pedestal assembly 12, a column assembly 14, a container support assembly 16, a container retaining means 18, and an operator's control panel 20. It is to be noted that FIG. 1 shows the container support assembly 16 in a lifted and tilted condition. This fully tilted condition shown, causes the container or drum 22 to be inverted. The container retaining means 18 preferably includes a funnel portion 24. This container retaining means 18 is adjustably attached to the container support assembly 16. This adjustable attachment allows the container retaining means 16 to be brought into engagement with the mouth of the container or drum 22. The funnel portion 24 may include an apparatus for breaking lumped granular material and/or a valve means, not shown. The valve means would selectively control the flow of material from the container. A butterfly valve such as my U.S. Pat. No. 4,462,567 may be used, but other types of suitable valves may be used. The valve would preferably be mounted at the small mouth of the funnel portion 24.

Referring now to FIG. 2, the column assembly 14 includes an elongated aperture 26 which provides a clearance for passage of the container support assembly 16. This container support assembly 16 includes a bottom portion which is shaped and sized to receive and support the weight of a container 22 placed thereon. The shaft portion 28 of the container support assembly 16 connects the container support frame 30 with a carriage assembly. This carriage assembly is housed interior of the column assembly 14 and will be discussed later. Preferably the elongated aperture 26 allows the container support assembly 16 to be lowered, as shown in solid outline, to a surface 32 supporting the apparatus 10. This surface 32 may be a floor, a fixed platform, a mobile platform, or the like. It has been found that an apparatus 10 having a single pedestal assembly 12 will accommodate lifts and tilted inversions, shown in dashed outline, in the vicinity of 3.05 meters (10 feet).

Referring now to FIG. 3, the apparatus 10 is shown as being turned along an arcuate path 34 from a first position 36 to a second position 38. The axis 40 for this arcuate path falls within the walls of the column assembly 14. FIG. 3 shows the container 22 as being turned or revolved clockwise in the vicinity of 90 arc degrees. The apparatus 10 is capable of clockwise and counterclockwise rotation up to 359 arc degrees.

Referring now to FIG. 4, the column assembly 14 is shown as an elongated and substantially tubular structure. This column assembly 14 houses a pair of elongated guide rails 42. These U-shaped guide rails 42 are attached to opposite side walls 44L and 44R of the column assembly 14. The carriage assembly 46, housed within the column assembly 14, rotatably carries the shaft 28 of the container support assembly 16. This carriage assembly 46 includes a plurality of guide rollers 48. These guide rollers 48 are rotatably secured to the carriage assembly 46. The guide rollers 48 are sized to closely fit into the U-shaped guide rails 42. The U-shaped guide rails 42 and the guide rollers 48 guided therein provide a desired controlled guidance for the carriage assembly 46 at any point along its vertical movement within the column assembly.

Still referring to FIG. 4, The carriage assembly 46 has a powered tilting means 50 carried thereon. This powered tilting means 50 is coupled to the shaft 28. Preferably this tilting means 50 includes a gear motor assembly which rotates the shaft 28 between 0.5 and 5 RPM. It has been found that 1 RPM provides satisfactory results when discharging materials from a container. The tilting means 50 may be pneumatically, hydraulically, or electrically powered.

Still referring to FIG. 4, the carriage assembly 46 is moved within the column assembly 14 by a lifting and lowering means 52. This lifting and lowering means 52 includes at least one flexible tension member 54 and a second powered gearmotor 56. Preferably the second gearmotor 56 has two output shafts 58 so that two tension members 54 may be coupled thereto. Preferably each flexible tension member 54 is a roller chain, of conventional design. The use of a roller chain allows convenient attachment of the tension member 54 to the carriage assembly 46. The use of a roller chain also provides a positive drive by way of sprocket 60.

The pedestal assembly 12 includes a pedestal shaft 62 which extends upwardly from a pedestal base 64. The axis of the pedestal shaft 62 falls within the side walls of the tubular column assembly 14. This shaft 62 is rotatably mounted to the column assembly 14 by at least one suitable anti-friction bearing 66. This anti-friction bearing 66, as shown in FIG. 4, has both radial and thrust bearing capability. The bearing 66 is housed in a lower end cap 68 of the column assembly 14. It is preferred that a pair of sealing rings 70 be provided to minimize the amount of materials entering or leaving the bearing 66. A spacer block 72 maintains a preferred distance between the bottom of the column assembly 14 and tile pedestal base 64. The end 74 of the shaft 62, distal the base 64, is coupled to a third gearmotor 76. This third gearmotor 76 is mounted to the column assembly 14 at a predetermined position. The distance between the third gearmotor 76 and the bearing 66 should be sufficient to resist any loading placed on it by the apparatus 10.

Figure 5:
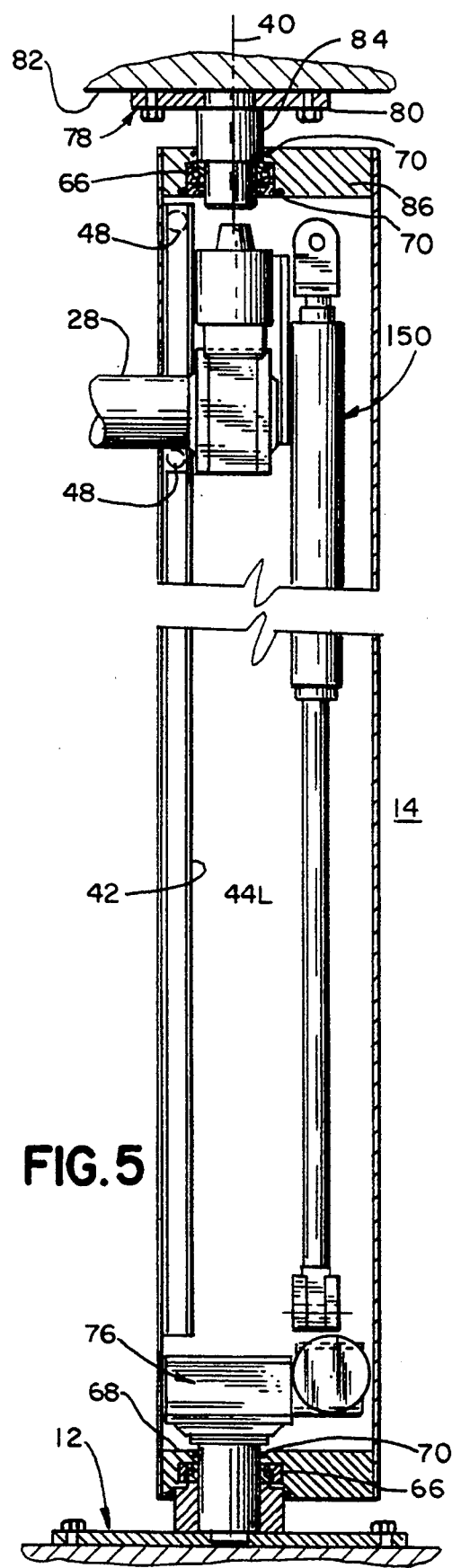
FIG. 5 represents an alternate embodiment of the column assembly of the present invention, this view being partly schematic and taken in the same direction as FIG. 4.

Referring to FIG. 5, a second pedestal assembly 78 may be provided when it is desired. This second pedestal 78 bas been found to be necessary when lifts exceed 3.05 meters (10 Feet). This second pedestal 78 includes a base plate 80 which is suitable for attaching to a surface 82 such as a ceiling, a platform, and the like. A shaft 84 of the second pedestal is rotatably carried by the column assembly 14 by a suitable anti-friction bearing 66. This bearing 66 is housed in an end cap 86 of the column assembly 14. It is preferred that a pair of sealing rings 70 be provided to minimize the amount of materials entering or leaving the bearing 66. It is to be noted that when the apparatus 10 is mounted by two pedestal assemblies the spacing between the third gearmotor and the end cap 68 may be reduced to a minimum.

Still referring to FIG. 5, an alternate lifting and lowering means 150 is shown. This lifting and lowering means 150 preferably is a linear actuator. This lifting and lowering means 150 may be electrically, pneumatically, or hydraulically operated. It is preferred that the lifting and lowering means 150 be hydraulically actuated.

Figure 6:
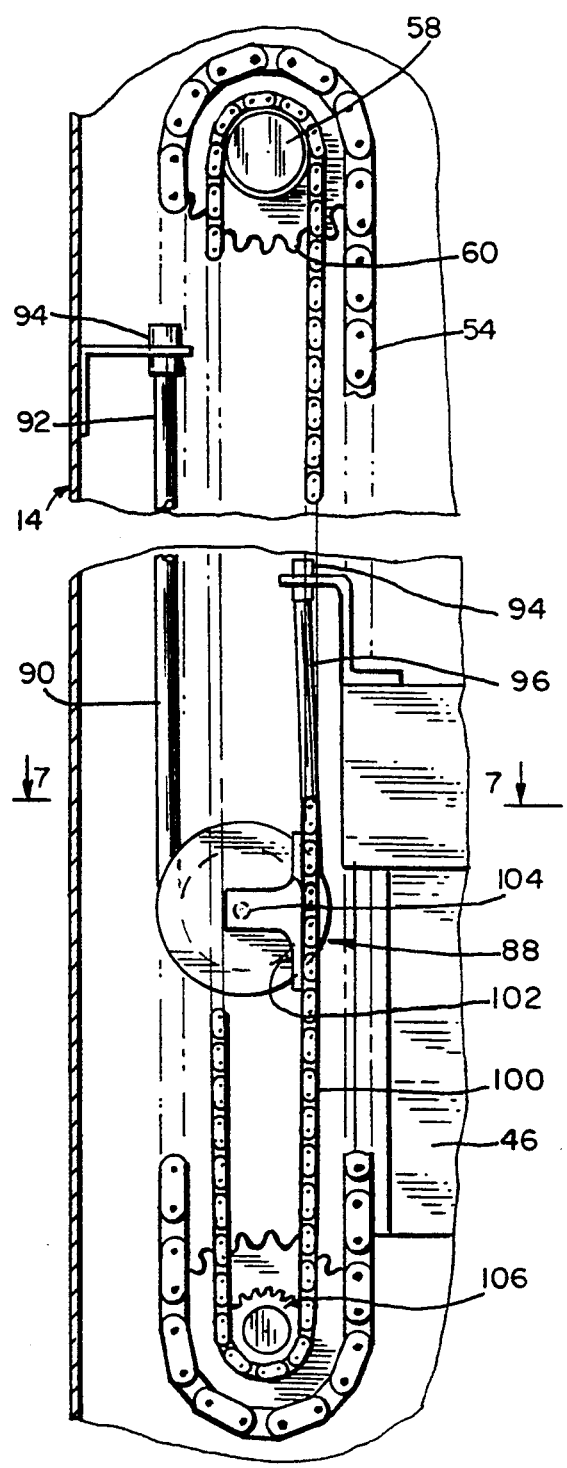
FIG. 6 represents a fragmentary view of a roller chain arrangement for lifting and lowering a carriage assembly, this enlarged scale view being taken in a direction opposite to FIG. 4, and also showing a tension controlling arrangement for the flexible conductors.

Referring now to FIG. 6, which is an enlarged view of the flexible tension member 54, the shaft 58, and the sprocket 60. FIG. 6 also shows a means 88 for controlling the path of at least one flexible conductor 90. It is most likely that apparatus 10 will have a plurality of flexible conductors 90 for carrying electrical signals and/or pressurized fluids to the various operating and sensing components. The one end 92 of each of the flexible conductors 90 is preferably attached to the column assembly 14 by way of a bulkhead connection 94. The other and 96 of each of the flexible conductors 90 is attached to a bulkhead 94 attached to the carriage assembly 46. Each flexible conductor is wrapped around a grooved roller 98. This grooved roller 98, more clearly seen in FIG. 7, is preferably made of a plastic material such as NYLON ®, but other suitable materials may be used. The use of a plastic material aids in minimizing wear between the components. The roller 98 is attached to a second roller chain 100, by way of a suitable mounting block 102. The roller 98 is rotatably journaled on its shaft 104. The chain 100 is driven by a sprocket 106. The sprocket 106 must be properly sized in order to provide the desired controlling action with substantially no additional tension on the conductors 90. The chain 100 should move one-half the distance of the tension means 54. As an example; a sprocket 60 specified as 50 pitch and 16 teeth, requires that sprocket 106 be 25 pitch, and 20 teeth. Each flexible conductor 90 is guided by its associated groove in the roller 98. This controlled guidance of the conductors also minimizes entanglement while limiting any tension on the individual conductors to within desired limits.

Alternatively, the apparatus 10 may be suspended by a single pedestal means, similar to pedestal assembly 12, from an upper support surface 82. This surface 82 may be stationary or mobile.

Referring now to FIG. 4, the elongated aperture 26 may include a closing means 110. One type of closing means 110 may take the form of a flexible strip of material 112 which is attached to the carriage assembly 46. This flexible material 112 preferably is guided in sealing tracks along the sides of the aperture 26. The ends of the flexible material 112 wound be spirally wound onto a pair of spindles 114. Each spindle 114 would be adapted for allowing the flexible material 112 to be wound or unwound thereon. This winding or unwinding on spindles 114 occurs as the carriage assembly 46 is lifted or lowered. This closing means 110 in cooperation with sealing means 70 limits the amount of materials entering or leaving the column assembly 14.

The present invention may be manually controlled by an operator. Various electrical switches or valves may be provided on the operators control panel 20. This present invention may also be automatically controlled by using appropriate sensors, encoders, valves, limit switches, and programmable controllers. The automatic control may include operator adjustable programs. The lifting, turning, and tilting action is independently actuated allowing each action to occur either separately or simultaneously with other actions.

The apparatus is adapted to be easily connected to a source of power, such as electrical and/or a pressurized fluid. When the apparatus of the present invention is mounted on a mobile platform the connection means may include quick disconnecting capabilities as needed.

USE AND OPERATION

Referring to FIG. 1; FIG. 2; and FIG. 3., the apparatus 10 is used for manipulating a receptacle 22. Usually the receptacle 22 contains a flowable material which is to be used in a process. Typically the receptacle or container 22 is placed on the bottom portion of a container support assembly or cradle 16. A container retaining means 18 is lowered to engage the mouth of the container 22. The apparatus 10 is selectively energized to manipulate the container 22 from a lowered position to a second position. Typically this manipulation involves lifting, turning, and tilting of the container support assembly 16 with the container 22 retained thereon. The manipulative steps utilized are independently controlled to provide various combinations of movements.

It is preferred that the retaining means 18 include a funnel portion 24 for directing the flow of the material to be discharged from the container 22. It is also preferred that a valve means, not shown, be attached to the small end of the funnel portion 24 to control the discharge of material. The use of a valve prevents premature discarding of the material as the container is brought to a fully tilted condition. This valve means also allows the operator to control the quantity of material being discharged without reversing the tilt of the container.

The arcuate turning capabilities of the apparatus 10 provide for the turning or indexing of a container from a first position 36 to a second position 38, more clearly seen in FIG. 3. The degree of turning is selectively controlled by an operator or automatic positioning controls.

This apparatus 10 may include a sealing means 70 and a closing means 110 which minimizes contamination of the processing area by the apparatus 10. That is escapement of materials from within the column assembly 14 is minimized by the use of the closing means 110 and the sealing means 70. An additional benefit of the sealing means 70 and the closing means is that airborne particles which would be harmful to the machinery cannot easily enter the column assembly 14.

After the container 22 is discharged, the carriage assembly 16 may be returned to its original position or a third position. This third position may be used for depositing of discharged receptacles. After removal of the discharged container, the carriage support assembly is then prepared to have another container placed thereon.

The present invention for an apparatus for lifting, turning, and tilting disclosed and described above also suggests a method for producing such an apparatus. This apparatus provides for the manipulation of a receptacle such as containers, drums, barrels and the like. The manipulation comprises the independent control of lifting, turning, and tilting of the container. The tilting of the container being sufficient for discharging any materials carried therein. This method includes the steps of:

providing at least one pedestal assembly, said pedestal assembly having an axis of its shaft in a substantially vertical array;

providing a column assembly, said column assembly being elongated and tubular, configuring at least one end of the column assembly for rotatable attachment to said shaft of the pedestal assembly.

providing a container support assembly, said container support assembly including a bottom portion sufficient to receive and support any container-placed thereon;

providing a means for retaining the container in a placed condition during lifting, turning, and tilting, said means for retaining the container being adjustably attached to said container support assembly;

providing a moveable carriage assembly interior of said column assembly, said carriage assembly including a plurality of guide rollers rotatably secured thereto, said carriage assembly rotatably supporting said carriage support assembly exterior of said column assembly by way of an elongated aperture being formed in a wall of the column assembly;

attaching U-shaped channel members to opposing interior walls of the column assembly, so that the guide rollers are guided therein;

mounting a lifting and lowering means for a controlled positioning of said carriage assembly with respect to said column assembly;

mounting a powered turning means interior of said column assembly for providing a controlled turning of said column assembly with respect to said pedestal assembly;

mounting a powered tilting means on said carriage assembly, said tilting means being housed interior of said column assembly, said tilting means providing a controlled tilting of said container support assembly;

providing a first controlling means for providing an independent control of said lifting and lowering means;

providing a second controlling means for providing an independent controlling of said turning means;

providing a third controlling means for providing an independent controlling means for said tilting means;

providing a flexible conductor controlling means interior of the column assembly, said flexible conductor controlling means providing guidance of any flexible conductors placed thereon, said flexible conductor controlling means traveling at one-half the movement of the carriage assembly with respect to the column assembly;

mounting a funnel portion and valve assembly on said container support assembly;

providing a sealing means at the end of the column rotatably attached to the pedestal assembly, while providing a closing means for said elongated aperture in said column assembly, wherein said sealing means and said closing means cooperating to minimize materials entering or leaving the column assembly; and providing a means for connecting said apparatus to a source of power.

The present invention as disclosed above also suggests a method for discharging a flowable material for a receptacle, such as a container, drum, barrel and the like. This method method includes the selective manipulative steps of:

providing a source of power to a lifting, turning and tilting apparatus, where an axis for said turning falls interior of a column assembly, said column assembly being elongated and tubular, said column assembly further having an elongated aperture being formed in a wall of said column assembly;

retaining a container on a container support assembly by engaging a retaining means, said container support assembly being rotatably carried on a carriage assembly, said carriage assembly being housed and guided completely within said column assembly;

manipulating the container from a first position to at least one subsequent position by independently controlling a flow of power from said power source to a lifting and lowering means, a turning means, and a tilting means, each of said lifting and lowering means, said turning means, and said tilting means being entirely housed interior of the column assembly;

discharging a quantity of a flowable material from the container in a tilted condition by actuating a discharge valve means;

returning said container to the first position by independently controlling each of said lifting and lowering means, said turning means, and said tilting means;

releasing said container on said container support assembly, by disengaging the retaining means.

Terms such as "left", "right", "up", "down", "bottom", "top", "front", "back", "in", "out", and the like are applicable to the embodiments shown and described in conjunction with the drawings. These terms are merely for the purpose of description and do not necessarily apply to the position in which the lifting, turning, and tilting apparatus of the present invention may be utilized.

While these particular embodiments of an improved lifting, turning, and tilting apparatus and method have been shown and described, it is to be understood that the invention is not limited thereto and protection is sought to the broadest extent the prior art allows.

What is claimed is:

1. An apparatus for lifting, turning, and tilting a container comprising:
   (a) a pedestal assembly including an elongated shaft member, said elongated shaft member being sized for supporting said apparatus in a substantially vertical array;
   (b) a column assembly, said column assembly being elongated and tubular, a wall of the column assembly having an elongated aperture formed therethrough, one end of said column assembly being rotatably carried on said elongated shaft, a container support assembly said elongated aperture providing a clearance for said container support assembly, said container support assembly including a bottom portion of sufficient size to receive and support the weight of any container placed thereon;
   (c) a means carried on said container support assembly for retaining the container in a placed condition on the container support assembly during lifting, turning and tilting of the container;
   (d) a moveable carriage member rotatably carrying said container support assembly; said moveable carriage member being positioned within said column assembly, said carriage member having a plurality of guide rollers rotatably secured thereto;
   (e) at least two U-shaped guide channel members, each U-shaped guide channel member being of a predetermined length, each U-shaped guide channel member being attached to opposing walls of the column assembly, said U-shaped guide channel members providing guideways for each of the guide rollers of said carriage member;
   (f) a selectively actuated lifting and lowering means for lifting and lowering said carriage member and said container support assembly, said lifting and lowering means being fully enclosed within said column assembly,
   (g) a selectively actuated turning means for first turning and then holding said column assembly with respect to the shaft of the pedestal assembly, said turning means being fully enclosed within said column assembly;
   (h) a selectively actuated tilting means for tilting said container support assembly with respect to said carriage member; said tilting means being carried interior of said column by said carriage member;

(i) a means for connecting said apparatus to a source of power, said power being supplied to the tilting means by at least one flexible conductor, said flexible conductor allowing full lifting of said tilting means with said carriage member;

(j) a first controlling means for independently controlling said lifting and lowering means;

(k) a second controlling means for independently controlling said turning means; and (l) a third controlling means for independently controlling said tilting means.

2. An apparatus as recited in claim 1 wherein said pedestal assembly is configured for attachment to a fixed support surface.

3. An apparatus as recited in claim 1 which includes a second pedestal assembly, said second pedestal assembly being rotatably attached to said column assembly at an end opposite to the first mentioned pedestal assembly.

4. An apparatus as recited in claim 3 wherein each end of said column assembly includes at least one sealing means for its associated pedestal assembly.

5. An apparatus as recited in claim 4 which further includes a closing means, said closing means arrayed for providing a closure of said elongated aperture of said column assembly, said closure of said elongated aperture being maintained as said container support assembly is positioned by said lifting and lowering means with respect to said column assembly.

6. An apparatus as recited in claim 1 wherein each of the lifting and lowering means, the turning means, and the tilting means includes a pneumatically driven gearmotor.

7. An apparatus as recited in claim 1 wherein said pedestal assembly is configured for attachment to a mobile support.

8. An apparatus as recited in claim 1 which further includes a flexible conductor controlling means, said flexible conductor controlling means providing for the guidance of any of said flexible conductors connecting said carriage carriage member with said column assembly, said flexible conductor controlling means configured for traveling at a rate of one-half of the movement of said carriage member.

9. An apparatus as recited in claim 8 wherein said flexible conductor controlling means includes a roller member, said roller member having at ]east one peripheral groove, said peripheral groove being configured for a predetermined seating arrangement with its associated flexible conductor.

10. An apparatus as recited in claim 1 wherein said container support assembly further includes a funnel portion for directing a flow of material being discharged from a container in a tilted condition.

11. An apparatus as recited in claim 10 wherein said container support assembly further includes a valve means for a selective control of the discharge of materials from said container.

* * * * *

UNITED STATES PATENT AND TRADEMARK OFFICE
CERTIFICATE OF CORRECTION

PATENT NO.  : 5,344,275
DATED       : September 6, 1994
INVENTOR(S) : Helmut Habicht It is certified that error appears in the above-indentified patent and that said Letters Patent is hereby corrected as shown below:

Title page, item [54] "APPARATU" should read --APPARATUS--
Column 1, Title: "APPARATU" should read --APPARATUS--
Column 1, line 43, "#or" should read --for--
Column 3, line 61, "wi thin" should read --within--
Column 4, line 46, "bas" should read --has--
Column 6, line 18, "discarding" should read --discharging--

Signed and Sealed this

Twenty-second Day of November, 1994

Attest:

BRUCE LEHMAN

*Attesting Officer*     *Commissioner of Patents and Trademarks*